R. G. HENRY.
SPRING SUSPENSION FOR ROAD VEHICLES.
APPLICATION FILED AUG. 8, 1917.
1,261,127.
Patented Apr. 2, 1918.
2 SHEETS—SHEET 2.
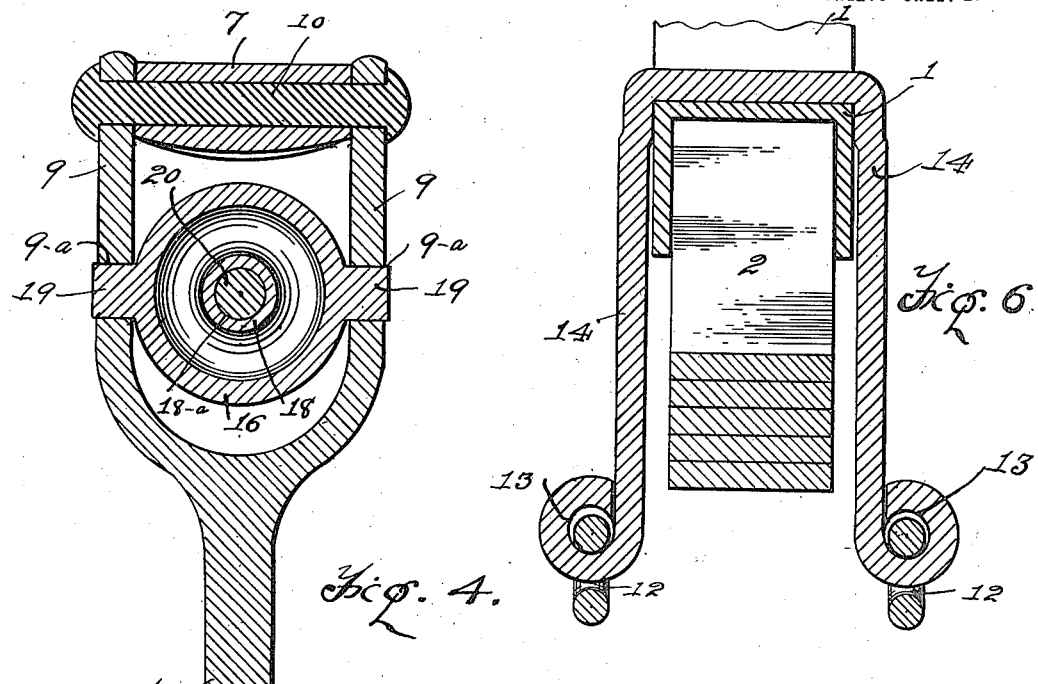
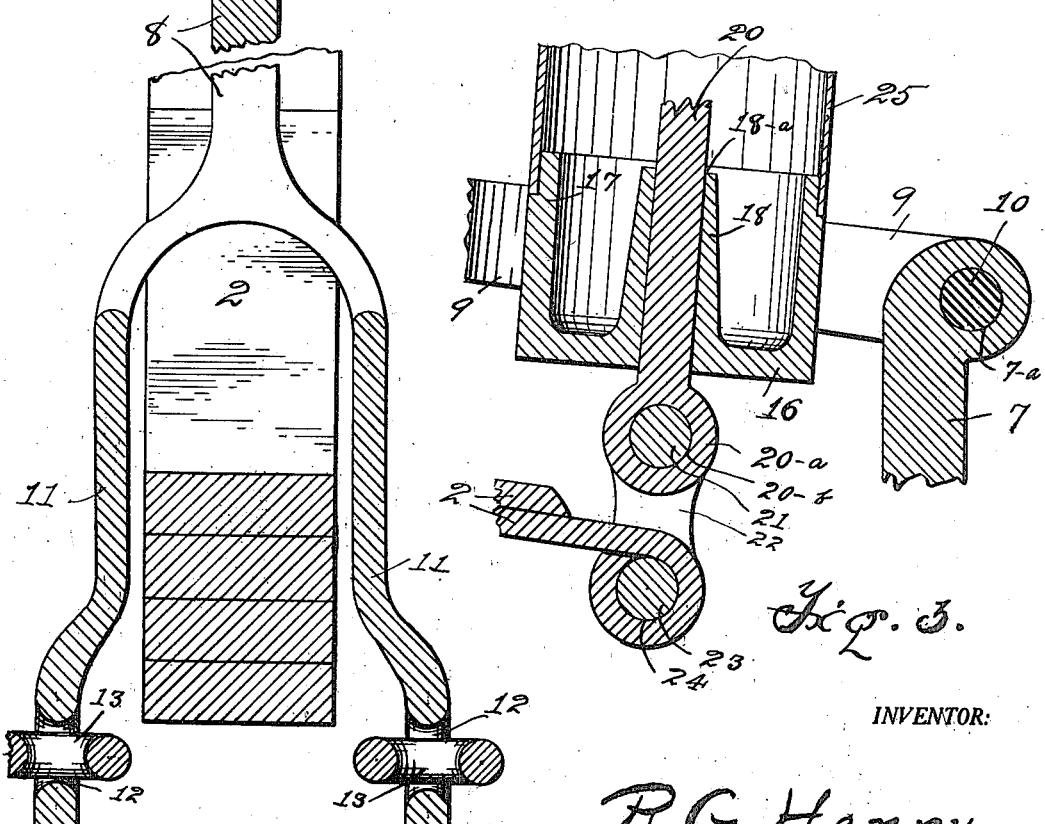
INVENTOR:
R. G. Henry.
By George F. Voight, assignee.

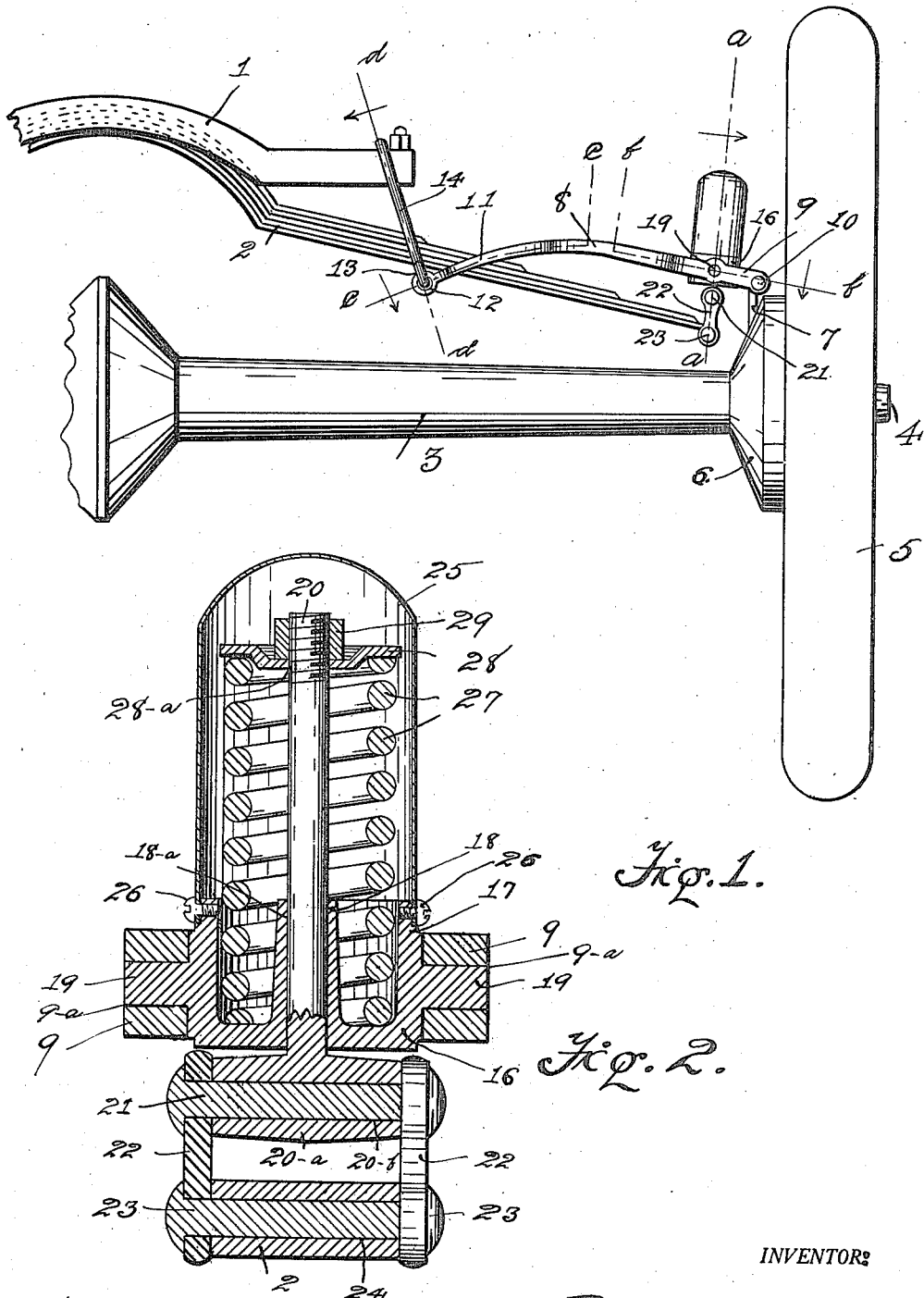

UNITED STATES PATENT OFFICE.

ROBERT G. HENRY, OF OAKLAND, CALIFORNIA, ASSIGNOR TO GEORGE F. VOIGHT, OF SAN FRANCISCO, CALIFORNIA.

SPRING SUSPENSION FOR ROAD-VEHICLES.

1,261,127.  Specification of Letters Patent.  Patented Apr. 2, 1918.

Application filed August 8, 1917. Serial No. 185,206.

*To all whom it may concern:*

Be it known that I, ROBERT G. HENRY, a citizen of the United States, residing at Oakland, in the county of Alameda, State of California, have invented new and useful Improvements in Spring Suspensions for Road-Vehicles, of which the following is a specification.

My invention relates to improvements in spring suspensions for road vehicles.

It has for one object to provide a new and improved form of spring suspension which may be used in conjunction with the normal leaf spring of a road vehicle, and which will coöperate in suspending and cushioning the vehicle. Another object is to provide such a spring suspension which may be more flexible and more quickly responsive than is the normal leaf spring suspension.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein—

Figure 1 is a rear elevation of the right-hand side of an automobile (with the body removed), showing my invention applied thereon.

Fig. 2 is a sectional view of a portion of my invention on line $a\ a$, Fig. 1.

Fig. 3 is a vertical section of a portion of the invention.

Fig. 4 is a sectional plan view of a portion of the invention on line $b\ b$, Fig. 1.

Fig. 5 is a sectional plan view of a portion of the invention on line $c\ c$, Fig. 1.

Fig. 6 is a section of a portion of the invention on line $d\ d$, Fig. 1.

Like parts are designated by like numerals in the several figures.

I have shown my invention as applied to an automobile of the cross spring suspension type, and have shown it applied only to the right-hand end of the rear axle. It would of course, be obvious that the invention might equally well be applied to other types of automobiles, and to the left-hand end of the axle as well as to the right-hand end and to the front as well as to the rear axle of any of them.

1 is a road vehicle frame supported by a principal leaf spring 2. 3 is the axle housing, 4 an axle journaled in the housing 3 and supported by a wheel 5. 6 is a brake drum disposed at outer end of the housing 3 and integral therewith. (In order to facilitate in designating certain parts of the automobile, the housing 3, axle 4 and brake drum 6, will hereinafter be designated as the axle-assembly.) To the upper side of the axle-assembly between the outer end of the latter and the outer end of the leaf spring 2, is fixedly secured a bracket 7 provided with a horizontal opening $7^a$ for journaling a pivot pin 10. To the pivot pin 10 is secured the outer and forked end of an oscillatory lever 8, the arms forming the fork of said forked end being designated by the numerals 9 9. The inner or free end of the lever 8 is also forked as indicated by the arms 11 11, which arms have at their free ends openings 12 12. Into the openings 12 12 are hooked the free or depending ends 13 13 of a connecting yoke 14 straddling and being supported by the frame 1. The outer end of the lever 8 being pivotally supported by the bracket 7, it is obvious that the inner end of the lever may move upwardly and downwardly with the upward and downward movements of the frame 1.

Through the arms 9 9 are horizontally extending openings $9^a\ 9^a$, in which openings are journaled two oppositely disposed trunnions 19 19 extending horizontally outwardly from a cup-shaped spring seat 16 provided with an upstanding annular marginal flange 17 and a central stud 18, which stud has a central opening $18^a$ forming a sliding bearing for a plunger 20, which plunger has a nut 29 threadedly engaging its upper end.

The cup-shaped spring seat 16 is supported by the lever 8 by means of the trunnions 19 19 and is oscillatable relative to the lever, through a vertical plane.

Upon the spring seat 16, with its lower end inside the flange 17, is disposed a spiral compression spring 27. Upon the upper end of the spring 27 is disposed a washer 28 having a central opening $28^a$ through which extends the upper end of the plunger 20, the nut 29 seating upon the washer.

The arrangement being such that the spring 16 resiliently supports the plunger 20.

The lower end of the plunger 20 is provided with a cross trunnion 20ª having a horizontal opening 20ᵇ, through which opening extends a pivot pin 21 supporting at each end links 22 22, which links support a second pivot pin 23 extending through a horizontal opening 24 in the end of the leaf spring 2.

The pivot pins 21 and 23 are fitted in the openings 20ᵇ and 24 respectively, so that they may rotate therein, permitting the leaf spring 2 to move endwise of itself relative to the trunnion 20ª, and the pivoting of the spring seat 16 on the lever 8, permits the plunger 20 to move longitidinally of itself in line extending parallel with the links 22 22.

25 is an inverted cup-shaped covering for the spring 27 and may be secured to flange 17 by means of screws 26.

The plunger 20 is movable upwardly and downwardly relative to the spring seat 16 with and against the tension of the spiral spring 27.

The function of the spiral spring 27 is to resiliently support the end of the leaf spring 2, and the principal reason why I support the free end of the lever 8 by the automobile frame is that by doing so the lever exerts a certain downward pull or pressure on same, which downward pull or pressure may be likened in a manner, to a load placed on the machine and it prevents to a great extent, the up-bound of the vehicle body when one of the wheels passes over an obstruction.

What I claim is—

1. A spring suspension for road vehicles, comprising a principal leaf spring, an axle-assembly, a lever pivoted at one end to the axle-assembly between the outer end of the latter and the outer end of the principal leaf spring, a portion of said lever overhanging an outer section of the principal leaf spring and extending in a general direction therewith, the free end of the lever being forked, a support movable vertically relative to the axle-assembly, a connection between the free ends of said fork and said support, an auxiliary spring supported by the lever intermediate its ends, and a pivotal connection between said auxiliary spring and the outer end of the principal leaf spring.

2. A spring suspension for road vehicles, comprising a principal leaf spring, an axle-assembly, a lever pivoted at one end to the axle-assembly between the outer end of the latter and the outer end of the princpal leaf spring, the intermediate section of the lever being disposed above the principal leaf spring and extending in a general direction therewith, the inner or free end of the lever terminating in a pair of arms, a support movable vertically relative to the axle-assembly, a nonresilient connection between the free ends of said arms and said support, an auxiliary spring carried by the lever intermediate its ends, and a connection between said auxiliary spring and the principal leaf spring.

3. A spring suspension for road vehicles, comprising a principal leaf spring, an axle-assembly, an oscillatory lever pivoted at one end to the axle-assembly between the outer end of the latter and the outer end of said leaf spring, a section of said lever being disposed above the leaf spring, the free end of the lever terminating in a pair of arms extending parallel to each other, one of said arms being disposed at one side of the leaf spring and the other of said arms being disposed at the opposite side of said leaf spring, a support movable upwardly and downwardly relative to the axle-assembly, a pair of nonresilient links having their upper ends connected to said support and their lower ends flexibly coupled to the free ends of said arms, and a connection between the outer end of the leaf spring and the lever intermediate its ends.

4. A spring suspension for road vehicles, comprising a principal leaf spring, an axle-assembly, an oscillatory lever pivoted at one end to the axle-assembly between the outer end of the latter and the outer end of the leaf spring, a section of the lever being disposed above the leaf spring, a support movable upwardly and downwardly relative to the axle-assembly, a connection between the free end of the lever and said support, an oscillatory spring seat carried by the lever intermediate its ends, a spiral spring supported by said spring seat, and a connection between said spiral spring and the outer end of the principal leaf spring.

5. A spring suspension for road vehicles, comprising a principal leaf spring, an axle-assembly, an oscillatory lever pivoted at one end to the axle-assembly, a connection between the free end of the lever and the vehicle frame, a spring seat supported by the lever intermediate its ends and movable relative thereto, a spiral compression spring supported by said spring seat, and a connection between said spiral spring and the outer end of the principal leaf spring.

6. A spring suspension for road vehicles, comprising a principal leaf spring, an axle-assembly, an oscillatory lever pivoted at one end to the axle-assembly, a connection between the free end of the lever and the vehicle frame, a spring seat pivotally supported by the lever intermediate its ends, and a resilient connection between said spring seat and the outer end of the principal leaf spring.

7. A spring suspension for road vehicles, comprising a principal leaf spring, an axle-assembly, an oscillatory lever pivoted at one end to the axle-assembly, a support, the support being movable upwardly and downwardly relative to the axle-assembly, a connection between the free end of the lever and said support, an element oscillatorily supported by the lever intermediate its ends, and a resilient connection between said element and the outer end of the principal leaf spring.

8. In a device of the character described, the combination with an oscillatory lever pivoted at one end to the axle-assembly and having a relatively movable support for its other end, of a spring seat supported by the lever intermediate its ends and oscillatable relative to the lever.

9. In a device of the character described, the combination with an oscillatory lever having one end pivotally supported by the axle-assembly and its other end supported by the vehicle frame, of a spring seat supported by the lever intermediate its ends and oscillatable relatively thereto, and a spiral compression spring carried by said spring seat and resiliently supporting one end of the vehicle's principal leaf spring.

10. In a device of the character described, the combination with an oscillatory lever having one end pivotally supported by the axle-assembly and its other end connected to a support movable upwardly and downwardly relative to the axle-assembly, of a spring seat supported by the lever intermediate its ends and oscillatable relatively thereto, the spring seat carrying a spiral compression spring arranged to yieldingly support one end of a leaf spring.

11. In a device of the character described, the combination with an oscillatory lever having one end pivotally supported by the axle-assembly and its other end supported by a relatively movable support, of an oscillatory spring seat carried by the lever intermediate its ends, the spring seat having a spiral compression spring seated thereon, the spiral spring being adapted for resiliently supporting the outer end of the vehicle's principal leaf spring.

ROBERT G. HENRY.